United States Patent
Nakayama

(10) Patent No.: US 12,496,731 B2
(45) Date of Patent: Dec. 16, 2025

(54) ROTATING SHAFT STRUCTURE PROVIDED WITH FORCE SENSOR, AND ROBOT

(71) Applicant: FANUC CORPORATION, Yamanashi (JP)

(72) Inventor: Kazutaka Nakayama, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 684 days.

(21) Appl. No.: 17/790,882

(22) PCT Filed: Mar. 11, 2021

(86) PCT No.: PCT/JP2021/009899
§ 371 (c)(1),
(2) Date: Jul. 5, 2022

(87) PCT Pub. No.: WO2021/187332
PCT Pub. Date: Sep. 23, 2021

(65) Prior Publication Data
US 2023/0061619 A1 Mar. 2, 2023

(30) Foreign Application Priority Data
Mar. 18, 2020 (JP) .................. 2020-048316

(51) Int. Cl.
*B25J 9/16* (2006.01)
*B25J 9/06* (2006.01)
(Continued)

(52) U.S. Cl.
CPC .............. *B25J 13/085* (2013.01); *B25J 9/06* (2013.01); *B25J 17/00* (2013.01); *H02K 11/24* (2016.01)

(58) Field of Classification Search
CPC ... B25J 13/085; B25J 9/06; B25J 17/00; B25J 19/0029; H02K 11/24
See application file for complete search history.

(56) References Cited

U.S. PATENT DOCUMENTS 5,155,423 A * 10/1992 Karlen ............... B25J 9/046
318/568.1
10,335,959 B2 * 7/2019 Ogata ............... B25J 17/00
(Continued)

FOREIGN PATENT DOCUMENTS

CN 105965534 A 9/2016
CN 106224517 A 12/2016
(Continued)

OTHER PUBLICATIONS

PCT International Search Report dated May 25, 2021 for related International Application No. PCT/JP2021/009899, from which the instant application is based, 3 pages.
(Continued)

*Primary Examiner* — Masud Ahmed
(74) *Attorney, Agent, or Firm* — Fredrikson & Byron, P.A.

(57) ABSTRACT

A rotary shaft structure includes an actuator having an output shaft for rotationally driving a driven body, a force sensor which is arranged between the output shaft and the driven body and which detects a force exerted between the output shaft and the driven body, and a flexible deformation body which is in contact with the output shaft and the driven body, wherein the entirety of the force sensor is sealed by the output shaft, the driven body, and the flexible deformation body.

18 Claims, 6 Drawing Sheets

(51) Int. Cl.
*B25J 13/08* (2006.01)
*B25J 17/00* (2006.01)
*H02K 11/24* (2016.01)

(56) References Cited

U.S. PATENT DOCUMENTS

| | | | |
|---|---|---|---|
| 10,471,593 B2* | 11/2019 | Tsuchiya | B25J 9/1651 |
| 2012/0286629 A1* | 11/2012 | Johnson | H02K 29/08 |
| | | | 310/68 B |
| 2015/0100159 A1* | 4/2015 | Park | H02K 11/21 |
| | | | 310/68 B |

FOREIGN PATENT DOCUMENTS

| | | |
|---|---|---|
| CN | 108068139 A | 5/2018 |
| DE | 102018213452 A1 | 2/2020 |
| JP | 2005321291 A | 11/2005 |
| JP | 2012250320 A | 12/2012 |
| JP | 2015123570 A | 7/2015 |
| JP | 2015155291 A | 8/2015 |
| JP | 2016168647 A | 9/2016 |
| JP | 2017015680 A | 1/2017 |
| JP | 2017104930 A | 6/2017 |
| JP | 2017159397 A | 9/2017 |
| JP | 2019089143 A | 6/2019 |
| JP | 2019090718 A | 6/2019 |
| WO | 2017182389 A1 | 10/2017 |

OTHER PUBLICATIONS

English Abstract and Machine Translation of German Publication No. 102018213452 A1, published Feb. 13, 2020, 16 pages.
English Abstract and Machine Translation of Japanese Publication No. 2019090718 A, published Jun. 13, 2019, 32 pages.
English Abstract and Machine Translation of Japanese Publication No. 2019089143 A, published Jun. 13, 2019, 31 pages.
English Abstract and Machine Translation of Japanese Publication No. 2017159397 A, published Sep. 14, 2017, 42 pages.
English Abstract and Machine Translation of Japanese Publication No. 2017104930 A, published Jun. 15, 2017, 27 pages.
English Abstract and Machine Translation of Japanese Publication No. 2016168647 A, published Sep. 23, 2016, 36 pages.
English Abstract and Machine Translation of Japanese Publication No. 2015155291 A, published Aug. 27, 2015, 27 pages.
English Abstract and Machine Translation of Japanese Publication No. 2015123570 A, published Jul. 6, 2015, 15 pages.
English Abstract and Machine Translation of Japanese Publication No. 2012250320 A, published Dec. 20, 2012, 46 pages.
English Abstract and Machine Translation of Japanese Publication No. 2005321291 A, published Nov. 17, 2005, 20 pages.

\* cited by examiner

ROTATING SHAFT STRUCTURE PROVIDED WITH FORCE SENSOR, AND ROBOT

RELATED APPLICATIONS

This application is a 35 U.S.C. 371 national phase filing from International Application No. PCT/JP2021/009899, filed Mar. 11, 2021, which claims priority to Japanese Application No. 2020-048316, filed Mar. 18, 2020, the contents of which are incorporated herein by reference.

FIELD

The present invention relates to a rotary shaft structure and a robot, and in particular, relates to a rotary shaft structure comprising a force sensor and, a robot.

BACKGROUND

In conventional high-performance collaborative robots, by incorporating force sensors which can detect force with high sensitivity into the joints, in many cases, it is possible to instantly detect a contact force with a human, whereby the robot can be stopped safely with a small contact force, and a lead-through operation can be performed with a light force during direct teaching, in which a person directly holds the robot mechanism part to teach the position and posture of the robot.

At the same time, in collaborative robots, there is a demand for a structure in which an umbilical member for driving the robot is arranged inside the robot mechanism so that the umbilical member does not become entangled with a person and is not exposed to the outside of the robot mechanism. Conventionally, it is desirable to maintain the umbilical member in a free state without restraint in the vicinity of the joint so that the umbilical member does not break or become broken due to the rotational movement of the joint. Furthermore, by not constraining the umbilical member, forces for restoring the umbilical member to its original state are less likely to be exerted on the force sensor, which contributes to an improvement in the detection accuracy of the force sensor.

However, in general, robots are often used in harsh environments where many foreign matters such as dust, debris, water, and oil are present, and since the force sensor itself may be corroded by foreign matter, making it impossible to maintain detection accuracy, foreign matter may enter the inside of the force sensor, which can cause force sensor failure, and foreign matter may bite into the umbilical member passing through the insertion part inside the force sensor, a joint structure which does not allow the entry of foreign matter is required. As technologies related to such a rotary shaft structure, the following literature is known.

Japanese Unexamined Patent Publication (Kokai) No. 2017-159397 (PTL 1) describes a robot comprising a joint portion which connects a first frame and a second frame, wherein the impact of disturbance torque due to wiring for driving the robot is suppressed by fastening the wiring to the first frame, the input part of the torque sensor, and the output part of the torque sensor with fasteners.

Japanese Unexamined Patent Publication (Kokai) No. 2015-123570 (PTL 2) describes a rotational shaft module wherein assembly and rearrangement of a robot is facilitated by connecting both ends of an umbilical member penetrating the interior of an actuator to respective relay parts (for example, connectors).

Japanese Unexamined Patent Publication (Kokai) No. 2019-90718 (PTL 3) describes a torque sensor in which a first structure and a second structure are connected by an elastic connecting member, wherein a detection unit for detecting relative movement between the first structure and the second structure is composed of a detection part which is affixed to one of the first structure and the second structure, a detected part which is affixed to the other of the first structure and the second structure, and a seal member which seals a space facing the detection part and the detected part.

Japanese Unexamined Patent Publication (Kokai) No. 2005-321291 (PTL 4) describes a wheel bearing device having a built-in load sensor, the load sensor comprising a detected part arranged on an outer ring of a constant velocity joint connected to an inner member, and a detection part which is arranged on an outer member facing the detected part and which detects the load acting on the wheel bearing by detecting changes in the detected part, wherein a part of a metal sealing ring overlaps a U-shaped notch where a cable to be pulled out from the detection part is arranged, which enhances waterproofness of the U-shaped notch.

Japanese Unexamined Patent Publication (Kokai) No. 2015-155291 (PTL 5) describes a power steering device comprising a torque sensor, which further comprises a housing through which a rotating shaft which transmits steering torque is inserted, a torque sensor having a sensor sleeve attached to the outer peripheral surface of the rotating shaft, and a seal member arranged between the outer peripheral surface of the sensor sleeve and the inner peripheral surface of the housing, wherein the seal member comprises a body part pressed onto the outer peripheral surface of the sensor sleeve, a first lip part which protrudes radially outward from the body part and abuts the inner peripheral surface of the housing, and a second lip which protrudes from the body part to the torque input side in the axial direction and abuts the vertical surface of the housing.

CITATION LIST

Patent Literature

[PTL 1] Japanese Unexamined Patent Publication (Kokai) No. 2017-159397
[PTL 2] Japanese Unexamined Patent Publication (Kokai) No. 2015-123570
[PTL 3] Japanese Unexamined Patent Publication (Kokai) No. 2019-90718
[PTL 4] Japanese Unexamined Patent Publication (Kokai) No. 2005-321291
[PTL 5] Japanese Unexamined Patent Publication (Kokai) No. 2015-155291

SUMMARY

Technical Problem

To prevent the entry of foreign matter, though the adoption of means wherein a force sensor is covered with a cover, packing or the like is inserted in the cover, which is fastened with bolts is considered, if the force sensor itself is sealed with these sealing members, the outer diameter and thickness of the force sensor will increase, whereby the rotary shaft structure will become larger and heavier. At the same time, the sealing members may affect the detection performance of the force sensor. Conversely, since the umbilical members may break or become broken due to the rotational movement, and the forces (reaction force) by which the umbilical members return to their original states during rotational movement increase as the number of umbilical members passing through the inside of the arm increases, the umbilical members may affect the detection performance of the force sensor.

There is a demand for a rotary shaft structure with which the detection accuracy of a force sensor can be stabilized or improved.

Solution to Problem

One aspect of the present disclosure provides a rotary shaft structure comprising an actuator having an output shaft for rotationally driving a driven body, and a force sensor which is arranged between the output shaft and the driven body and which detects a force exerted between the output shaft and the driven body, the rotary shaft structure comprising a flexible deformation body which is in contact with the output shaft and the driven body, wherein the entirety of the force sensor is sealed by the output shaft, the driven body, and the flexible deformation body.

Another aspect of the present disclosure provides a rotary shaft structure comprising an actuator having an output shaft for rotationally driving a driven body, a force sensor which is arranged between the output shaft and the driven body and which detects a force exerted between the output shaft and the driven body, and an insertion hole which penetrates the actuator and the force sensor in an axial direction of the output shaft and into which an umbilical member is inserted, wherein the force sensor comprises a communication substrate which is capable of serial communication or wireless communication, and the number of the umbilical members inserted into the insertion hole is reduced by the communication substrate.

Advantageous Effects of Invention

According to the aspect of the present disclosure, since the entire force sensor is sealed by the output shaft, driven body, and flexible deformation body, corrosion or failure of the force sensor or biting of foreign matter is prevented, and it is not necessary to provide a sealing member on the force sensor itself. Therefore, the force sensor can be made smaller and lighter, and whereby, a small and lightweight rotary shaft structure can be provided. At the same time, since the flexible deformation body flexibly deforms following the strain of the force sensor and does not generate a reaction force, the detection accuracy of the force sensor is not impacted. Specifically, a rotary shaft structure with which the detection accuracy of the force sensor can be stabilized or improved can be provided.

According to the other aspect of the present disclosure, since the force sensor comprises a communication substrate capable of serial communication or wireless communication, the number of umbilical members inserted into the insertion hole can be reduced, whereby the possibility of disconnection of the umbilical members due to rotational movement can be reduced, and the reaction force which restores the umbilical member to its original state during the rotational movement can be suppressed. Specifically, a rotary shaft structure with which the detection accuracy of the force sensor can be stabilized or improved can be provided.

DESCRIPTION OF EMBODIMENTS

Figure 1:
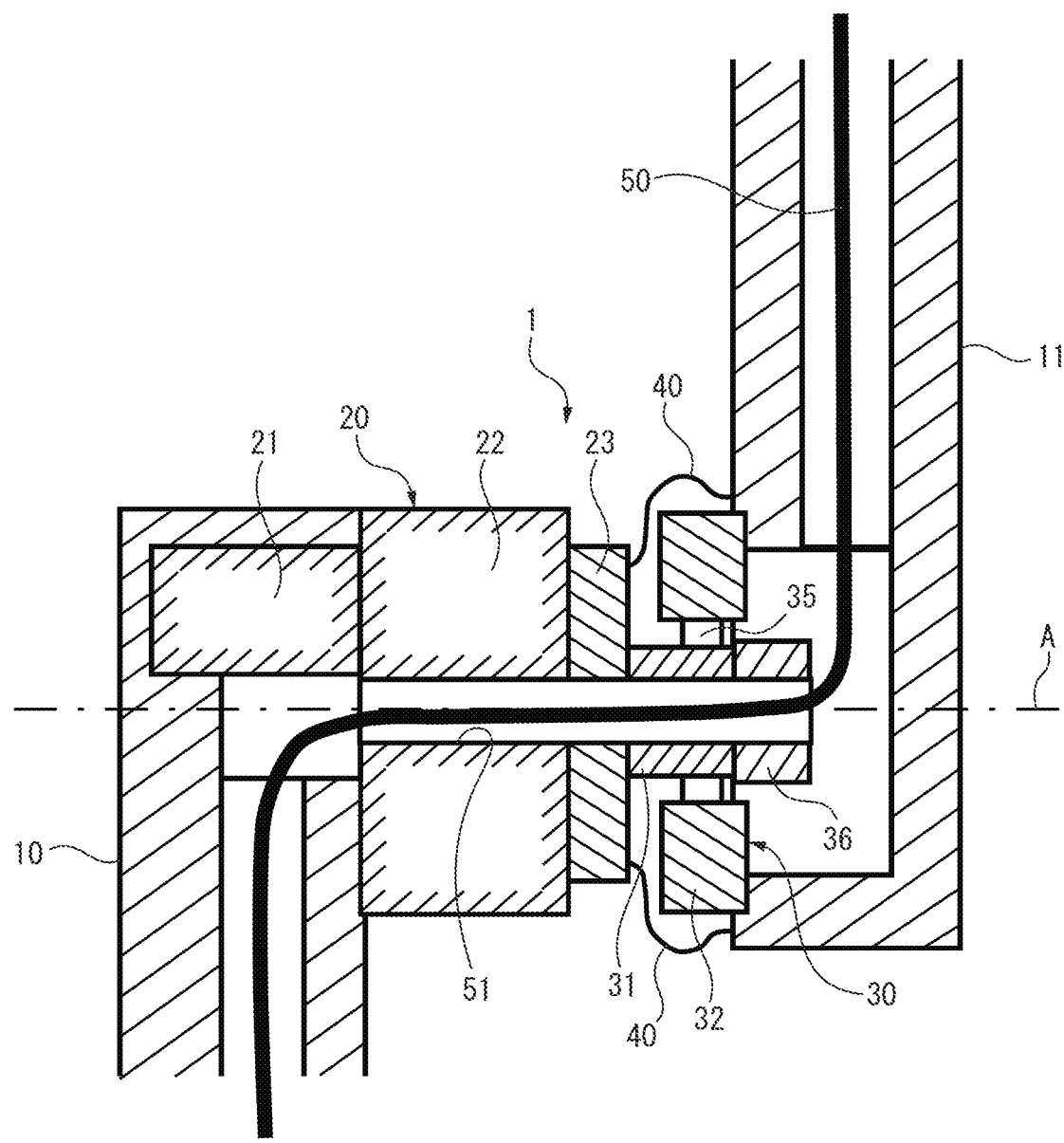
FIG. 1 is a cross-sectional view showing a rotary shaft structure of an embodiment.

The embodiments of the present disclosure will be described in detail below with reference to the attached drawings. In the drawings, identical or similar constituent elements have been assigned the same or similar reference signs. Furthermore, the embodiments described below do not limit the technical scope of the invention described in the claims or the definitions of the terms.

FIG. 1 shows a rotary shaft structure 1 according to the present embodiment. The rotary shaft structure 1 is, for example, a Joint structure of a robot, but may be a rotary shaft structure in another shaft-type machine such as a machine tool, construction machinery, or a vehicle. The rotary shaft structure 1 is a structure in which a driven body 11 is rotated relative to a body 10, and comprises an actuator 20 for rotationally-driving the driven body 11 and a force sensor 30 for detecting a force exerted between the actuator 20 and the driven body 11.

The actuator 20 is affixed to the body 10, comprises, for example, a drive source 21 such as a motor, and a speed reducer 22 for reducing the output speed of the drive source 21, and may be a direct drive motor which lacks a speed reducer 22. The actuator 20 comprises an output shaft 23 which rotationally drives the driven body 11. The force sensor 30 is arranged between the output shaft 23 and the driven body 11, and detects forces exerted between the output shaft 23 and the driven body 11. Though the force sensor 30 is a three-axis force sensor which is capable of detecting, for example, the moment Mz about the A(Z) axis when the A axis is set as the Z axis, and forces Fx and Fy in the two directions perpendicular to the A(Z) axis and perpendicular to each other, it may be a six-axis force sensor which can detect six axial-direction forces Mx, My, Mz, Fx, Fy, and Fz. Furthermore, it may be a single-axis torque sensor which is capable of detecting only the moment Mz about the A(Z) axis when the A axis is set as the Z axis. The types of forces (forces, moments) which can be detected by the force sensor and the number of axes that can be detected (degrees of freedom of detection) are not limited to the embodiments described above. The types of forces that can be detected and the number of axes that can be detected may be arbitrarily combined.

Figure 2:
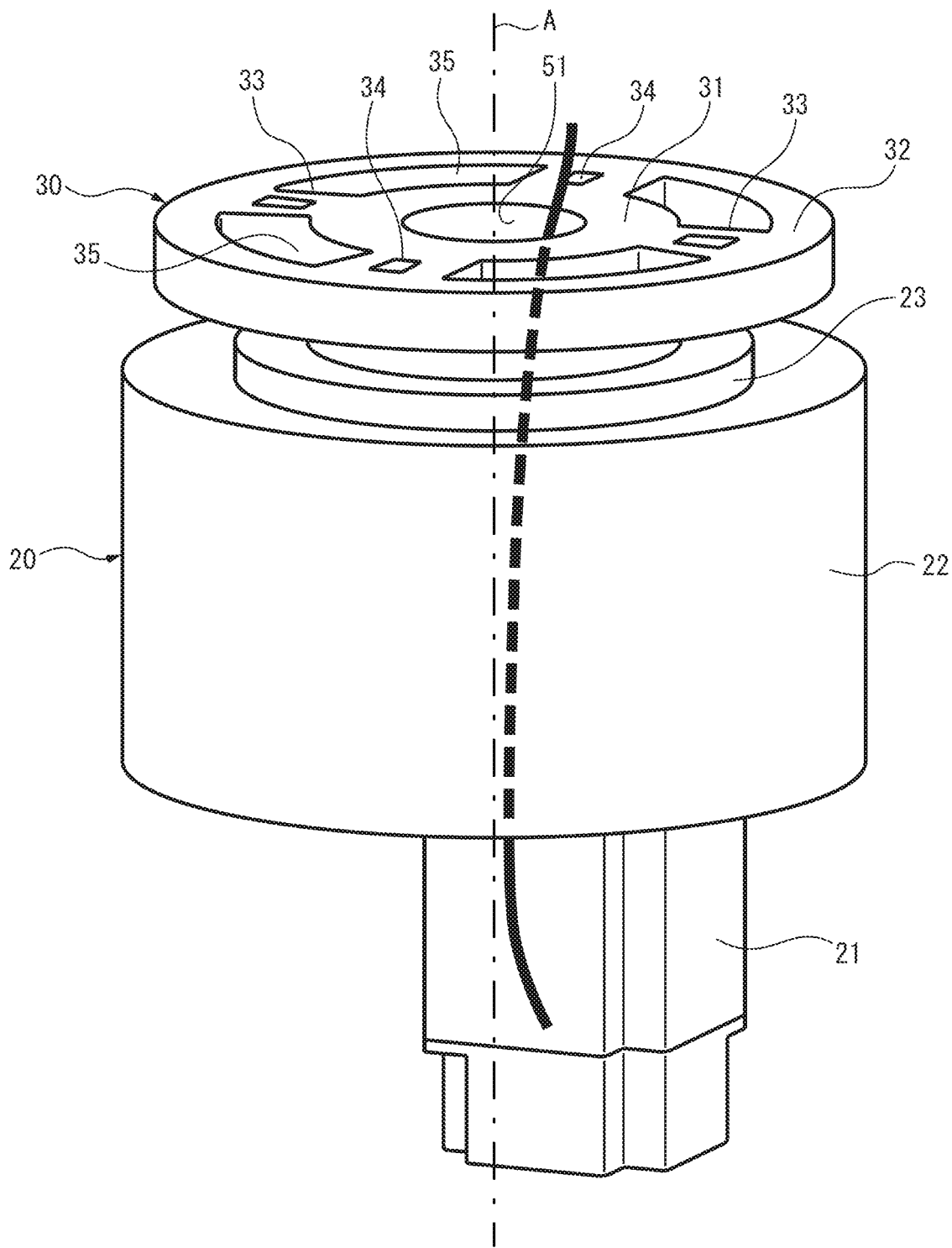
FIG. 2 is a perspective view showing details of a force sensor.

FIG. 2 shows the details of the force sensor 30. Though the force sensor 30 is, for example, a strain gauge-type force sensor, it may be another detection type force sensor such as a piezoelectric type, optical type, capacitance type, or magnetostrictive type force sensor. For example, the force sensor 30 comprises an input body 31 connected to the output shaft 23, an output body 32 connected to the driven body 11, a distorting body 33 which connects the input body 31 and the output body 32 and which is capable of generating strain by the relative rotation of the input body 31 and the output body 32, and a strain detection sensor 34 which is capable of detecting the strain generated by the distorting body 33, but various structures may be adopted depending on the detection type.

Referring again to FIG. 1, the rotary shaft structure 1 further comprises a flexible deformation body 40 which contacts the output shaft 23 and the driven body 11, and the entirety of the force sensor 30 is sealed by the output shaft 23, the driven body 11, and the flexible deformation body 40. Since the flexible deformation body 40 prevents foreign matter from entering the space around the force sensor 30 through a gap 35 formed between the input body 31 and the output body 32, corrosion of the force sensor 30 can be prevented. At the same time, since the force sensor 30 itself does not have a sealing member and does not need to have high dustproof ability, high waterproof ability, high rustproof ability, etc., the force sensor 30 can be made smaller and lighter, whereby a small and lightweight rotary shaft structure 1 can be provided.

Furthermore, in the flexible deformation body 40, it is desirable that the contact portions with the output shaft 23 and the driven body 11 do not move relative to the output shaft 23 and the driven body 11, respectively, and it is desirable that the portion excluding the contact portions flexibly deform and not generate a reaction force. The degree of flexibility and the degree of reaction force of the flexible deformation body 40 may be, for example, a degree of softness such that a deformation amount of several hundred microns to several millimeters (i.e., the strain amount of the force sensor 30) generates substantially no reaction force for restoring to its original shape (i.e., the detection accuracy of the force sensor 30 is not impacted), though the reaction force need not necessarily be zero. The deformation portion of the flexible deformation body 40 may be a flexible thin film-like (for example, a thin wall of 0.01 mm) portion formed from an elastic material such as an elastomer such as a rubber balloon, and the contact portion between the flexible deformation body 40 and the output shaft 23 or the driven body 11 is preferably affixed with an adhesive, threaded engagement, etc. As a result, in the flexible deformation body 40, the portion excluding the contact portions (i.e., the deformation portion) is flexibly deformed following the strain of the force sensor 30 and does not generate a reaction force while the contact portions with the output shaft 23 and the driven body 11 do not move relative to the output shaft 23 and the driven body 11, respectively. Thus, a rotary shaft structure 1 in which the detection accuracy of the force sensor 30 can be stabilized or improved can be provided.

The rotary shaft structure 1 preferably comprises an insertion hole 51 which penetrates the actuator 20 and the force sensor 30 in the axial direction of the axis of rotation A and through which the umbilical member 50 passes. Particularly in the joint structure of a robot, the umbilical member 50 can include at least one of an umbilical member for driving of the actuator 20, an umbilical member for communication of the force sensor 30, and an umbilical member for driving of a tool attached to the tip of the robot. Specifically, the umbilical member 50 can include a large number of umbilical members composed of, for example, a power cable, a signal cable, an air tube for a suction hand, etc. By inserting the umbilical member 50 into the insertion hole 51, the umbilical member 50 is arranged inside the rotary shaft structure 1 and does not become entangled with a person, which is particularly advantageous in the case of a joint structure of a collaborative robot. At the same time, since the insertion hole 51 communicates with the gap 35 of the force sensor 30, and the flexible deformation body 40 prevents foreign matter from entering the insertion hole 51 from the gap 35, damage to the umbilical member 50 due to corrosion or biting of foreign matter in the insertion hole 51 can be suppressed.

It is preferable that the force sensor 30 further comprise a communication substrate 36 which is capable of serial communication or wireless communication. Specifically, it is preferable that the communication substrate 36 sequentially transmit or receive data bit-by-bit via one wired or wireless transmission path. Since the communication substrate 36 reduces the number of umbilical members 50 inserted into the insertion hole 51, the possibility of disconnection of the umbilical member 50 due to the rotational movement can be further reduced, and the reaction force for restoring the umbilical member 50 to its original state during the rotational movement can be suppressed. In other words, a rotary shaft structure 1 in which the detection accuracy of the force sensor 30 can be stabilized or improved can be provided. Furthermore, since the entire force sensor 30 is sealed by the flexible deformation body 40, a sealing function of the communication substrate 36 itself can be eliminated, and the outer shape of the force sensor 30 can be further miniaturized.

It is desirable that the umbilical members 50 for the communication substrate 36 or for the force sensor 30 are capable of being connected in a daisy chain. When there are a plurality of rotary shaft structures 1, in particular in the joint structure of an articulated robot, by daisy-chaining the umbilical members 50 for the communication substrate 36 or for the force sensor 30 of each joint, the number of umbilical members 50 inserted through the insertion hole 51 can be further reduced. Thus, the possibility of disconnection of the umbilical member 50 due to the rotation operation can be further reduced, and the reaction force for restoring the umbilical member 50 to its original state during the rotation operation can be further suppressed.

Furthermore, the rotary shaft structure 1 preferably comprises a failover arrangement in which the detection circuit of the force sensor 30 is duplicated. For example, as shown in FIG. 2, the rotary shaft structure 1 preferably comprises at least two distorting bodies 33, and at least two strain detection sensors 34 which detect the strain generated in each of the two distorting bodies 33 are preferably daisy-chained in a separate circuit by the umbilical members 50 for a communication substrate 36 or for the force sensor 30. Alternatively, the rotary shaft structure 1 may comprise at least one distorting body 33, and at least two strain detection sensors 34 which detect the strain generated in the one distortion body 33 may be daisy-chained in a separate circuit by the umbilical members 50 for the communication substrate 36 or for the force sensor 30. As a result, even if one of the detection circuits fails for some reason, the robot can be safely stopped by the other detection circuit, in particular in a collaborative robot. At the same time, even when the detection circuits of the force sensor 30 are duplicated, since the two detection circuits can be each daisy-chained, an increase in the number of umbilical members 50 inserted into the insertion hole 51 can be significantly suppressed.

Figure 3:
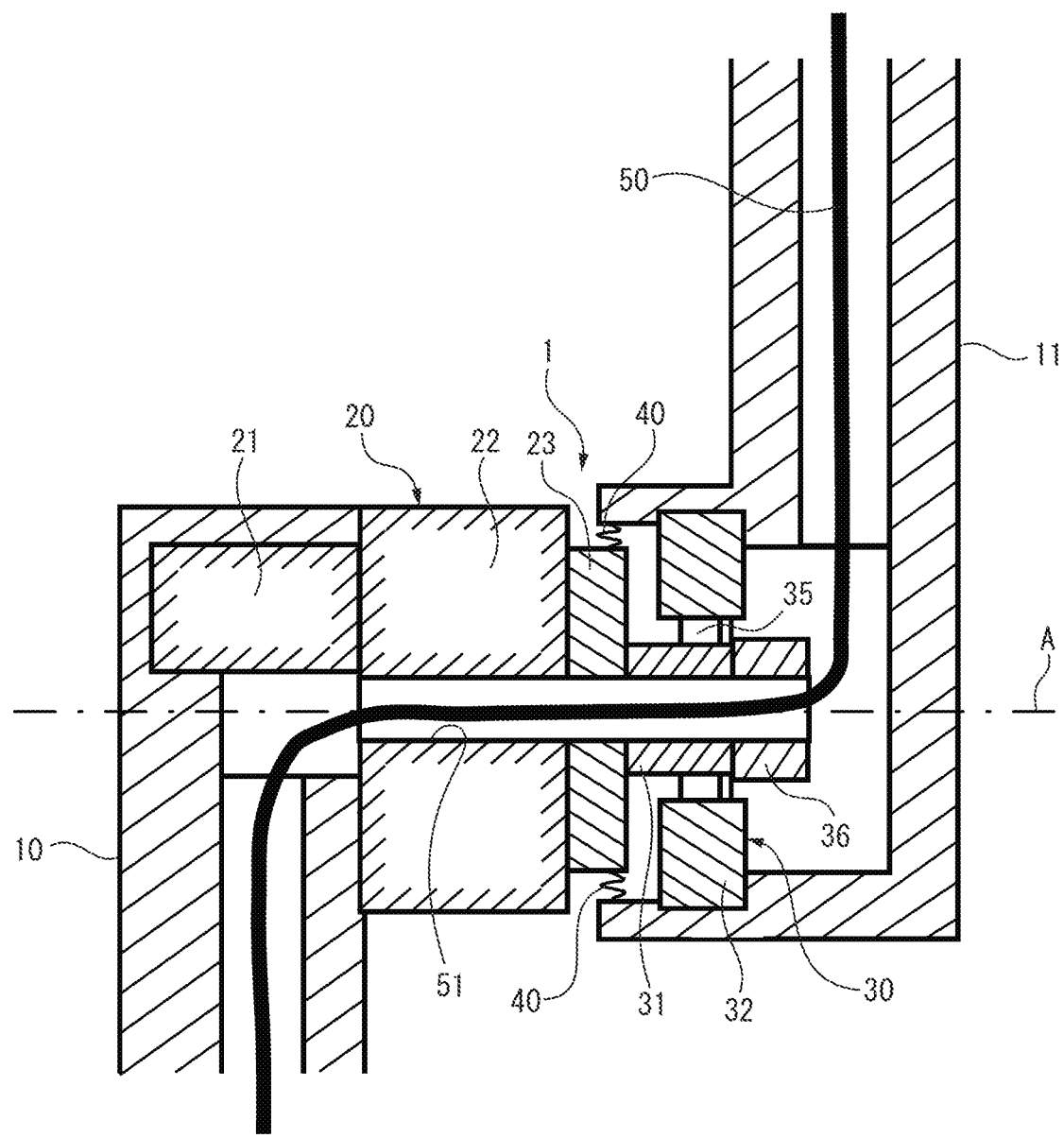
FIG. 3 is a cross-sectional view showing a rotary shaft structure of another embodiment.

FIG. 3 shows the rotatory shaft structure 1 of another embodiment. The rotary shaft structure 1 of this example differs from that of the foregoing in that the driven body 11 covers the outer circumference of the force sensor 30 and extends to the side of the output shaft 23. By bringing the driven body 11 closer to the output shaft 23, the size of the flexible deformation body 40 in contact with the output shaft 23 and the driven body 11 can be reduced, whereby the possibility of affecting the force sensor 30 can be minimized.

Figure 4:
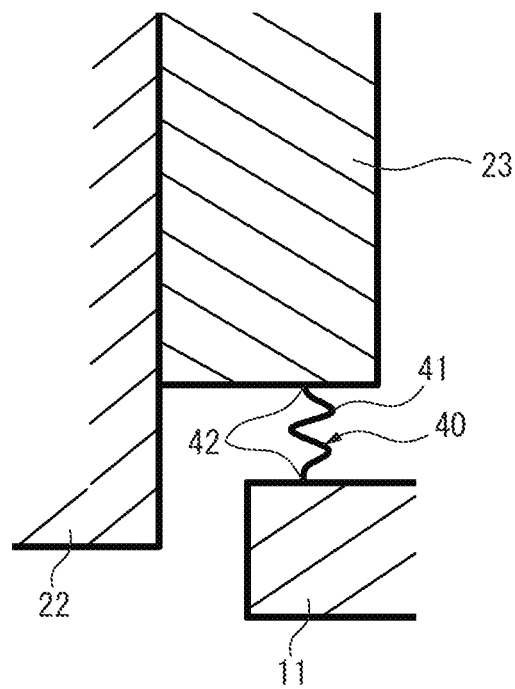
FIG. 4 is an enlarged cross-sectional view showing a flexible deformation body having slack.

The rotary shaft structure 1 of this example also differs from that of the foregoing in that the flexible deformation body 40 has slack. FIG. 4 is an enlarged view of the flexible deformation body 40 having slack. The deformation portion 41 of the flexible deformation body 40 has slack in the same manner as a burst and withered rubber balloon, and contact portions 42 of the flexible deformation body 40 with the output shaft 23 and the driven body 11 are preferably affixed by adhesive, threaded engagement, etc. The degree of slack in the flexible deformation body 40 may be a degree of slack such that a reaction force for restoring the original shape is substantially not generated (i.e., the detection degree of the force sensor 30 is not impacted) at a deformation amount of, for example, hundreds of microns to several millimeters (i.e., the strain amount of the force sensor 30). Though the slack is formed so as to undulate in the radial direction of the axis of rotation, it may be formed so as to undulate in a direction inclined with respect to the radial direction of the axis of rotation. As a result, in the flexible deformation body 40, the portion excluding the contact portions (i.e., the deformation portion 41) flexibly deforms following the strain of the force sensor 30 and does not generate a reaction force while the contact portions 42 with the output shaft 23 and the driven body 11 do not move relative to the output shaft 23 and the driven body 11, respectively. Thus, a rotary shaft structure 1 in which the detection accuracy of the force sensor 30 can be stabilized or improved can be provided.

Figure 5:
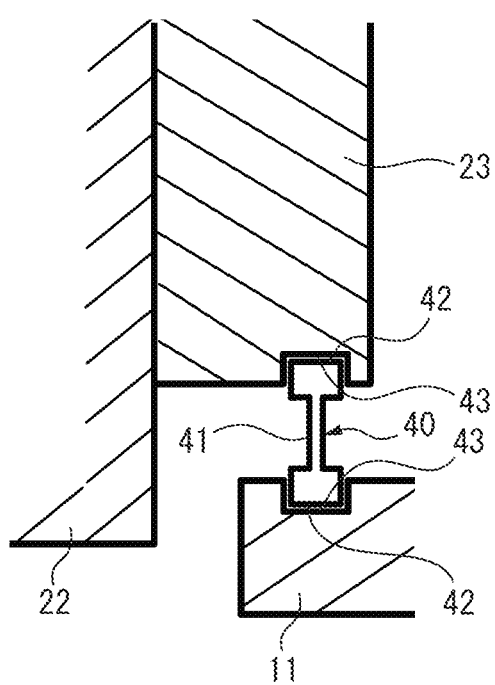
FIG. 5 is an enlarged cross-sectional view showing another modification example of a flexible deformation body.

FIG. 5 shows another modification example of the flexible deformation body 40, Though the deformation portion 41 of the flexible deformation body 40 is a flexible thin-film portion formed from an elastic material such as an elastomer, the contact portions 42 of the flexible deformation body 40 with the output shaft 23 and the driven body 11 may not be affixed but at least one surface of each of the contact portions 42 may have a coefficient of friction so as to prevent relative motion thereof. For example, there may be adopted a configuration wherein relative motion prevention grooves 43 for preventing relative motion of the flexible deformation body 40 are formed in the outer peripheral surface of the output shaft 23 and the inner peripheral surface of the driven body 11 in the circumferential direction, and relative motion of the contact portions 42 is prevented by mating (i.e., inserting) them into the relative motion prevention grooves 43 while elastically deforming the areas near the contact portions 42 of the flexible deformation body 40. Furthermore, in order to prevent relative motion of the flexible deformation body 40, at least one surface of the contact portions 42 of the flexible deformation body 40 with the output shaft 23 and the driven body 11 may have a surface roughness wherein the coefficient of friction is increased, such as a roughened portion or a portion having concavities and convexities. As a result, in the flexible deformation body 40, the portion excluding the contact portions 42 (i.e., the deformation portion 41) is flexibly deformed following the strain of the force sensor 30 and does not generate a reaction force without relative movement between the contact portions 42 with the output shaft 23 and the driven body 11 and the output shaft 23 and the driven body 11, respectively. Thus, a rotary shaft structure 1 in which the detection accuracy of the force sensor 30 can be stabilized or improved can be provided.

Figure 6:
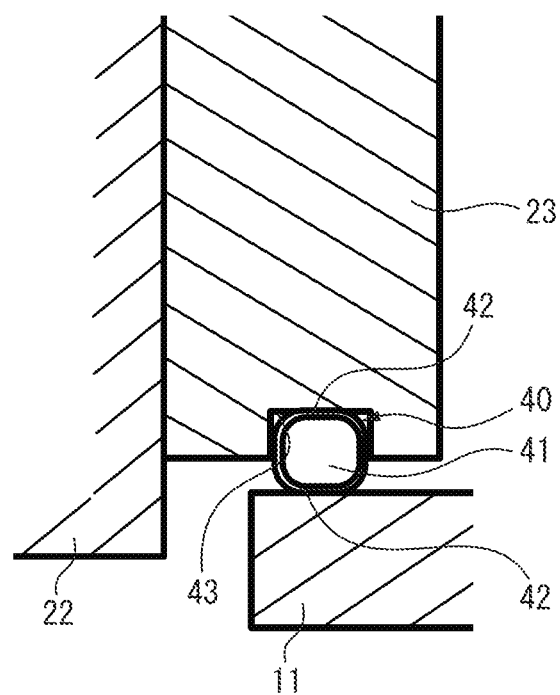
FIG. 6 is an enlarged cross-sectional view showing yet another modification example of a flexible deformation body.

FIG. 6 shows yet another modification example of the flexible deformation body 40. The flexible deformation body 40 may be an O-ring shaped member having a two-layer structure. The deformation portion 41 of the flexible deformation body 40 may be an inner layer portion composed of a fluid such as a gas, a liquid, or a gel, and the contact portions 42 of the flexible deformation body 40 with the output shaft 23 and the driven body 11 may be a flexible thin-film outer layer portion composed of an elastic material such as an elastomer. Alternatively, though the deformation portion 41 (inner layer portion) is composed of the same elastic material as the contact portions 42 (outer layer portion), such as an elastomer, it may be composed of a material which is more flexible than the contact portions 42 (outer layer portion). Furthermore, the deformation portion 41 (inner layer portion) and the contact portions 42 (outer layer portion) may be formed from the same flexible elastic material, such as an elastomer, and the surfaces of the contact portions 42 (outer layer portion) may have a coefficient of friction so as to prevent motion thereof relative to the surfaces of the output shaft 23 and the driven body 11. For example, there may be adopted a configuration wherein a relative motion prevention groove 43 for preventing relative motion of the flexible deformation body 40 is formed in the outer peripheral surface of the output shaft 23 in the circumferential direction, and relative motion of the contact portion 42 is prevented by mating (i.e., inserting) it into the relative motion prevention groove 43 while elastically deforming the areas near the contact portion 42 of the flexible deformation body 40. Furthermore, in order to prevent relative motion of the flexible deformation body 40, at least one surface of the contact portion 42 of the flexible deformation body 40 with the output shaft 23 may have a surface roughness wherein the coefficient of friction is increased, such as a roughened portion or a portion having concavities and convexities. Conversely, though the contact portion 42 of the flexible deformation body 40 with the driven body 11 is affixed by an adhesive or the like, there may be adopted a configuration wherein a relative motion prevention groove is formed in the outer peripheral surface of the driven body 11 in the circumferential direction, and relative motion of the contact portion 42 is prevented by mating it into the relative motion prevention groove while elastically deforming the areas near the contact portion 42 of the flexible deformation body 40. As a result, in the flexible deformation body 40, the portion excluding the contact portions 42 (i.e., the deformation portion 41) is flexibly deformed following the strain of the force sensor 30 and does not generate a reaction force while the contact portions 42 with the output shaft 23 and the driven body 11 do not move relative to the output shaft 23 and the driven body 11, respectively. Thus, a rotary shaft structure 1 in which the detection accuracy of the force sensor 30 can be stabilized or improved can be provided.

Figure 7:
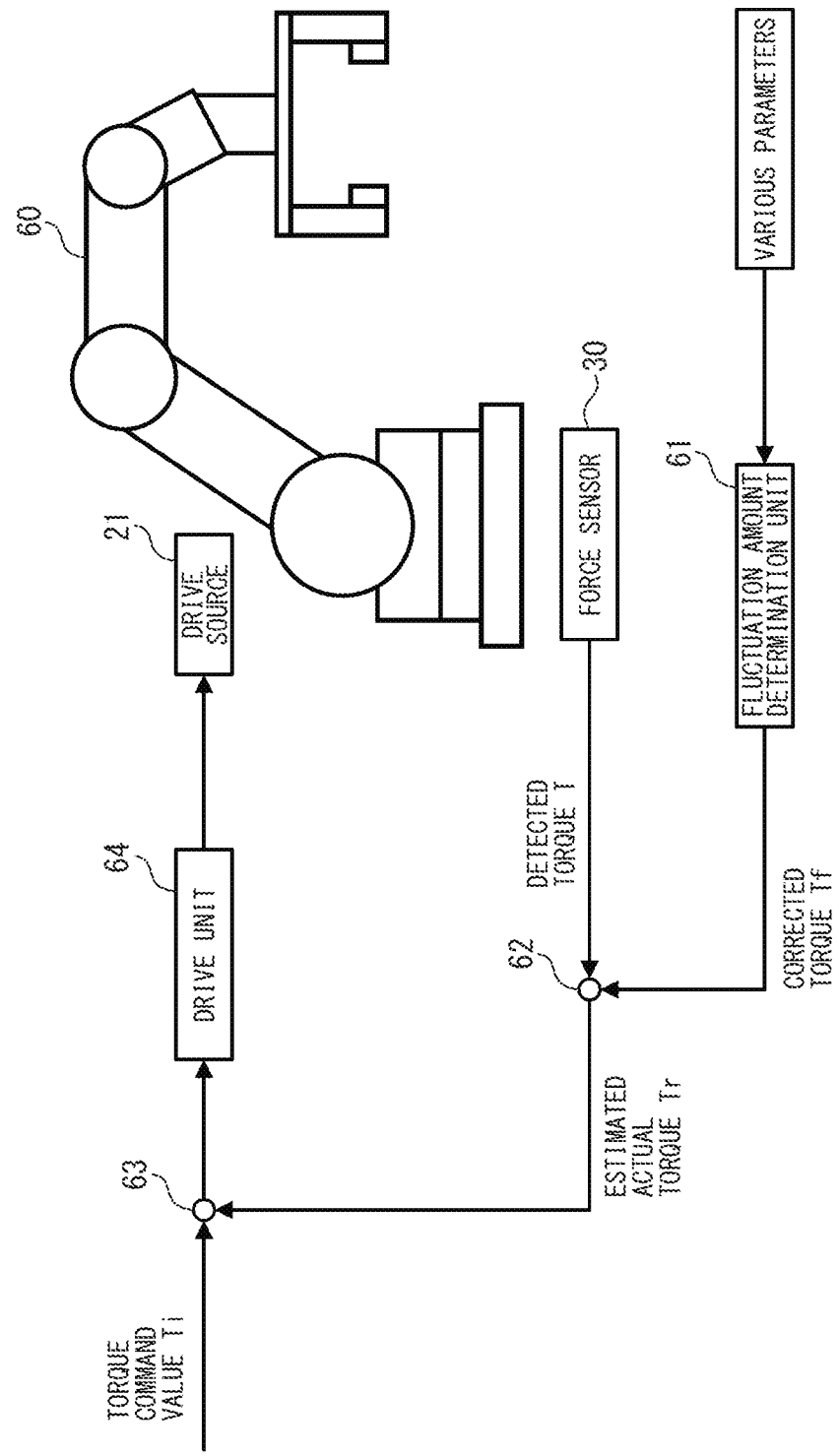
FIG. 7 is a block diagram showing an example of a robot in which a fluctuation amount of a force sensor is corrected.

FIG. 7 shows an example of a robot 60 in which the fluctuation amount of the force sensor 30 is corrected. When the rotary shaft structure 1 described above is applied to a joint structure of the robot 60, it is desirable that the robot 60 comprise a controller which estimates and corrects the fluctuation amount (interference force of other axes) of the force sensor 30 acting on a specific joint axis. The controller comprises a fluctuation amount determination unit 61 which estimates the fluctuation amount of the force sensor 30 acting on a specific joint axis using known parameters of the robot 60, a force correction unit 62 which corrects the force detected by the force sensor 30 based on the estimated fluctuation amount, a motion command correction unit 63 which corrects a motion command based on the corrected force, and a drive unit 64 which drives a drive source 21 of a specific joint axis based on the corrected motion command.

For example, it is preferable that the fluctuation amount determination unit 61 calculate, from the posture of the robot 60 at a certain instance, the overturning moment in a direction other than the rotation direction or static load in another direction (first other axial force component) acting on a specific joint axis using known parameters such as the wrist load and arm mass of the robot 60, calculate, from the operating speed of the robot 60 at a certain instance, the overturning moment or force in the other direction (second other axial force component) due to inertial forces acting on a specific joint axis in a direction other than the rotational direction using known parameters such as the wrist load and arm mass of the robot 60, and estimate a correction torque Tf by adding the first other axial force component and the second other axial force component.

Furthermore, the force correction unit 62 calculates an estimated actual torque Tr by subtracting the estimated correction torque if from the detected torque T of the force sensor 30. The estimated actual torque Tr represents the actual torque generated in the rotation direction of the specific joint axis, excluding other axial force components acting on the specific joint axis in directions other than the rotation direction.

The motion command correction unit 63 calculates the drive torque by subtracting the calculated estimated actual torque Tr from the torque command value Ti, which is the motion command of the robot 60. The drive unit 64 drives the drive source 21 with the calculated drive torque. Specifically, the detected torque T detected by the force sensor 30 while the drive source 21 is being driven is used as the estimated actual torque Tr after the correction torque Tf is subtracted for feedback control of the drive unit 64. As a result, for example, when the operator directly touches a robot mechanism part and applies an external force to perform lead-through teaching, the actual torque generated in the rotation direction of a specific joint axis due to an external force can be accurately estimated.

According to the embodiment described above, since the entire force sensor 30 is sealed by the output shaft 23, the driven body 11, and the flexible deformation body 40, not only can the corrosion of the force sensor 30 be suppressed and biting of foreign matter be suppressed, but since it is not necessary to provide a sealing member on the force sensor 30 itself, the force sensor 30 can be made smaller and lighter, whereby a small and lightweight rotary shaft structure 1 can be provided. At the same time, since the flexible deformation body 40 flexibly deforms following the strain of the force sensor 30 and does not generate a reaction force, the detection accuracy of the force sensor 30 is not impacted. Specifically, a rotary shaft structure 1 with which the detection accuracy of the force sensor 30 can be stabilized or improved can be provided.

Furthermore, since the force sensor 30 is provided with a communication substrate capable of serial communication or wireless communication, the number of umbilical members 50 inserted into the insertion hole 51 is reduced, whereby the possibility of disconnection of the umbilical members 50 due to the rotational movement can be reduced, and the reaction force for restoring the umbilical member 50 to its original state during rotational movement can be suppressed. Specifically, a rotary shaft structure 1 with which the detection accuracy of the force sensor 30 can be stabilized or improved can be provided.

Though various embodiments have been described in the present description, the present invention is not limited to the embodiments described above, and it should be understood that various changes can be made within the scope described in the claims.

REFERENCE SIGNS LIST 1 rotary shaft structure
10 body
11 driven body
20 actuator
21 drive source
22 speed reducer
23 output shaft
30 force sensor
31 input body
32 output body
33 distorting body
34 strain detection sensor
35 gap
36 communication substrate
40 flexible deformation body
41 deformation portion
42 contact portion
43 relative motion prevention groove
50 umbilical member
51 insertion hole
60 robot
61 fluctuation amount determination unit
62 force correction unit
63 motion command correction unit
64 drive unit
A axis of rotation

The invention claimed is:

1. A rotary shaft structure comprising an actuator having an output shaft for rotationally driving a driven body, and a force sensor which is arranged between the output shaft and the driven body and which detects a force exerted between the output shaft and the driven body, the rotary shaft structure comprising:
a flexible deformation body which is in contact with the output shaft and the driven body, wherein the entirety of the force sensor is sealed by the output shaft, the driven body, and the flexible deformation body.

2. The rotary shaft structure according to claim 1, wherein in the flexible deformation body, contact portions with the output shaft and the driven body do not move relative to the output shaft and the driven body, respectively, and portions excluding the contact portions flexibly deform and do not generate a reaction force.

3. The rotary shaft structure according to claim 1, wherein a contact portion between the flexible deformation body and the output shaft or the driven body is affixed or at least one surface of the contact portion has a coefficient of friction so as to prevent relative movement thereof.

4. The rotary shaft structure according to claim 1, wherein a deformation portion of the flexible deformation body is a flexible thin film-shaped portion.

5. The rotary shaft structure according to claim 1, wherein a deformation portion of the flexible deformation body has slack.

6. The rotary shaft structure according to claim 1, wherein a contact portion of the flexible deformation body mates with a relative motion prevention groove formed in at least one of the output shaft and the driven body.

7. The rotary shaft structure according to claim 1, wherein the driven body covers an outer circumference of the force sensor and extends to the side of the output shaft.

8. The rotary shaft structure according to claim 1, wherein the force sensor comprises an input body connected to the output shaft, an output body connected to the driven body, and a distorting body which connects the input body and the output body and which is capable of generating strain due to the relative rotation between the input body and the output body, and
the flexible deformation body prevents foreign matter from entering into a space formed between the input body and the output body.

9. The rotary shaft structure according to claim 1, wherein the force sensor itself does not comprise a sealing member.

10. The rotary shaft structure according to claim 1, further comprising an insertion hole which penetrates the actuator and the force sensor in an axial direction of the output shaft and into which an umbilical member is inserted, wherein the flexible deformation body prevents foreign matter from entering the insertion hole.

11. The rotary shaft structure according to claim 10, wherein the force sensor comprises a communication substrate which is capable of serial communication or wireless communication, wherein the number of the umbilical members inserted into the insertion hole is reduced by the communication substrate.

12. The rotary shaft structure according to claim 11, wherein the umbilical members for the communication substrate or for the force sensor are capable of daisy-chain connection.

13. A rotary shaft structure comprising an actuator having an output shaft for rotationally driving a driven body, a force sensor which is arranged between the output shaft and the driven body and which detects a force exerted between the output shaft and the driven body, and an insertion hole which penetrates the actuator and the force sensor in an axial direction of the output shaft and into which an umbilical member is inserted, wherein
the force sensor comprises a communication substrate which is capable of serial communication or wireless communication, and the number of the umbilical members inserted into the insertion hole is reduced by the communication substrate.

14. The rotary shaft structure according to claim 13, wherein the umbilical members for the communication substrate or for the force sensor are capable of daisy-chain connection.

15. The rotary shaft structure according to claim 13, wherein the force sensor comprises an input body connected to the output shaft, an output body connected to the driven body, at least two distorting bodies which connect the input body and the output body and which are capable of generating strain due to the relative rotation between the input body and the output body, and at least two strain detection sensors which detect the strain generated by the respective two distorting bodies, and each of the strain detection sensors is daisy-chained connected in a separate circuit by the umbilical members for the communication substrate or for the force sensor.

16. The rotary shaft structure according to claim 13, wherein the force sensor comprises an input body connected to the output shaft, an output body connected to the driven body, at least one distorting body which connects the input body and the output body and which is capable of generating strain due to the relative rotation between the input body and the output body, and at least two strain detection sensors which detect the strain generated by the one distorting body, and each of the strain detection sensors is daisy-chained connected in a separate circuit by the umbilical members for the communication substrate or for the force sensor.

17. A robot comprising the rotary shaft structure according to claim 1 as a joint structure, the robot comprising a fluctuation amount determination unit which estimates a fluctuation amount of the force using known parameters of the robot, and a force correction unit which corrects the force detected by the force sensor based on the estimated fluctuation amount.

18. A robot comprising the rotary shaft structure according to claim 10 as a joint structure, wherein the umbilical member includes at least one of an umbilical member for actuator driving, an umbilical member for force sensor communication, and an umbilical member for driving of a tool attached to a robot tip.

* * * * *